(12) United States Patent
Chen et al.

(10) Patent No.: US 10,404,440 B2
(45) Date of Patent: Sep. 3, 2019

(54) METHOD, USER EQUIPMENT, AND BASE STATION FOR TRANSMITTING CHANNEL STATE INFORMATION

(75) Inventors: Xiaobo Chen, Beijing (CN); Yongxia Lv, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 13/593,181

(22) Filed: Aug. 23, 2012

(65) Prior Publication Data

US 2012/0314685 A1     Dec. 13, 2012

Related U.S. Application Data

(63) Continuation of application No. PCT/CN2011/072465, filed on Apr. 6, 2011.

(30) Foreign Application Priority Data

Apr. 6, 2010  (CN) .......................... 2010 1 0147431

(51) Int. Cl.
*H04L 5/00* (2006.01)
*H04W 48/08* (2009.01)
*H04W 72/12* (2009.01)

(52) U.S. Cl.
CPC ............ *H04L 5/0057* (2013.01); *H04L 5/001* (2013.01); *H04W 48/08* (2013.01); *H04W 72/1289* (2013.01)

(58) Field of Classification Search
None
See application file for complete search history.

(56) References Cited

U.S. PATENT DOCUMENTS 8,599,715 B2 * 12/2013 Kim et al. .................... 370/252
8,654,701 B2 *  2/2014 Kazmi et al. ................ 370/318
(Continued)

FOREIGN PATENT DOCUMENTS

CN      1830161 A    9/2006
CN    101296508 A   10/2008
(Continued)

OTHER PUBLICATIONS

"Link Results on CSI RS Design," Panasonic, 3GPP TSG RAN WG1 Meeting #59bis, R1-100373, Valencia, Spain, Jan. 18-22, 2010, 5 pages.
"Aperiodic CQI Reporting for Carrier Aggregation," Panasonic and HTC, R1-101262, 3GPP TSG-RAN WG1 Meeting 60, San Francisco, CA, USA, Feb. 22-26, 2010, 2 pages.
(Continued)

*Primary Examiner* — Donald L Mills
(74) *Attorney, Agent, or Firm* — Huawei Technologies Co., Ltd.

(57) ABSTRACT

A method, a user equipment, and a base station for transmitting channel state information (CSI) are disclosed. First, a scheduling grant command is sent by a base station. A CSI location label is obtained according to information of a resource occupied by the scheduling grant command and information of a resource occupied by a data channel that is indicated by the scheduling grant command. CSI of a carrier corresponding to the CSI location label is sent to the base station through the data channel. The CSI location label may be obtained through the scheduling grant command and the CSI of the carrier corresponding to the CSI location label may be sent or received without changing a length of an aperiodic CSI request field.

20 Claims, 5 Drawing Sheets

(56) References Cited

U.S. PATENT DOCUMENTS

| | | | |
|---|---|---|---|
| 2006/0198293 A1 | 9/2006 | Nishio et al. | |
| 2009/0190528 A1* | 7/2009 | Chung et al. | 370/328 |
| 2009/0204863 A1 | 8/2009 | Kim et al. | |
| 2010/0034092 A1* | 2/2010 | Krishnamurthy et al. | 370/241 |
| 2010/0120397 A1* | 5/2010 | Kazmi et al. | 455/410 |
| 2010/0234037 A1* | 9/2010 | Terry | H04L 1/0023 455/450 |
| 2010/0271970 A1* | 10/2010 | Pan | H04L 1/0026 370/252 |
| 2011/0170499 A1* | 7/2011 | Nayeb Nazar et al. | 370/329 |
| 2011/0243012 A1* | 10/2011 | Luo | H04L 5/0055 370/252 |
| 2011/0249582 A1* | 10/2011 | Choi et al. | 370/252 |
| 2012/0076017 A1* | 3/2012 | Luo et al. | 370/252 |
| 2012/0147773 A1* | 6/2012 | Kim et al. | 370/252 |

FOREIGN PATENT DOCUMENTS

| | | |
|---|---|---|
| CN | 101662833 A | 3/2010 |
| CN | 101808370 A | 8/2010 |
| CN | 101826949 A | 9/2010 |
| CN | 102082625 A | 6/2011 |
| WO | 2009030555 A1 | 3/2009 |
| WO | WO 2009/045139 A1 | 4/2009 |
| WO | WO 2009/096698 A2 | 8/2009 |
| WO | 2009123549 A2 | 10/2009 |
| WO | WO 2010/006540 A1 | 1/2010 |

OTHER PUBLICATIONS

"3GPP TS 36.213 v9.1.0 Technical Specification—$3^{rd}$ Generation Partnership Project; Technical Specification Group Radio Access Network; Evolved Universal Terrestrial Radio Access (E-UTRA); Physical Layer Procedures (Release 9)," $3^{rd}$ Generation Partnership Project, Mar. 2010, 65 pages.

International Search Report regarding International Patent Application No. PCT/CN2011/072465, dated Jul. 14, 2011, 4 pages.

Extended European Search Report received in Application No. 11780088.8-2412, Applicant: Huawei Technologies Co., Ltd., dated Jan. 21, 2012, 5 pages.

Written Opinion of the International Searching Authority received in International Application No. PCT/CN2011/072465, Applicant: Huawei Technologies Co., Ltd. et al., dated Jul. 14, 2011, 3 pages.

3GPP TS 36.300 V9.2.0,3rd Generation Partnership Project;Technical Specification Group Radio Access Network; Evolved Universal Terrestrial Radio Access (E-UTRA) and Evolved Universal Terrestrial Radio Access Network (E-UTRAN);Overall description; Stage 2(Release 9),Dec. 2009,total 178 pages.

TSG-RAN WG1 #53 R1-082199,"Physical-layer parameters to be configured by RRC",Ericsson, May 5-9, 2008,total 13 pages.

3GPP TSG-RAN WG1 Meeting 59bis R1-100372,"Aperiodic CQI Reporting for Carrier Aggregation",Panasonic, HTC Corporation, Jan. 18-22, ,total 2 pages.

3GPP TSG RAN WG1 Meeting #60bis R1-101940,"CQI/PMI/RI reporting for carrier aggregation",Huawei, Apr. 12-16, 2010,total 5 pages.

\* cited by examiner

METHOD, USER EQUIPMENT, AND BASE STATION FOR TRANSMITTING CHANNEL STATE INFORMATION

This application is a continuation of International Application No. PCT/CN2011/072465, filed on Apr. 6, 2011, which claims priority to Chinese Patent Application No. 201010147431.2, filed on Apr. 6, 2010, both of which are incorporated herein by reference.

TECHNICAL FIELD

The present invention relates to the field of wireless communications, and in particular, to a method, a user equipment, and a base station for transmitting channel state information.

BACKGROUND

In a long term evolution (LTE) system, a base station senses a quality status of a downlink channel through a channel quality indication (CQI) that is fed back by a user equipment, so as to help to perform frequency selective scheduling. In a long term evolution-advanced (LTE-A) system, a carrier aggregation technology is selected to support a wider bandwidth to satisfy a requirement of the International Telecommunication Union for a peak data rate of the $4^{th}$ generation communication technology. Meanwhile, a coordinated multiple point transmission and reception (CoMP) technology is selected to improve coverage of the system for high-data rate users and increase a throughput at a cell edge and a system throughput. The CQI is a type of channel state information (CSI). In the carrier aggregation technology, one user equipment may access multiple downlink component carriers concurrently. In the CoMP technology, one user equipment may access multiple cells concurrently. When the user equipment accesses multiple downlink component carriers and/or cells concurrently, how to schedule and feed back CSI on a data channel becomes a problem that needs to be further researched.

In the LTE system and the LTE-A system, CSI feedback scheduled through a scheduling grant command on a data channel is also referred to as aperiodic CSI feedback. Currently, a method for transmitting the aperiodic CSI feedback includes: concurrently sending or receiving aperiodic CSI feedback information of all cells or downlink component carriers which a user equipment accesses, or increasing a length of an aperiodic CSI feedback request field in an uplink scheduling grant command; allocating an aperiodic CSI request field to each cell or each downlink component carrier; and sending or receiving aperiodic CSI feedback information of all or a part of cells or downlink component carriers to be fed back.

When the number of cells and/or carriers of the user equipment is larger, the number of bits for concurrently sending or receiving aperiodic CSI is large, which easily causes a waste of uplink resources. In addition, transmission performance of an aperiodic CSI can be guaranteed only with a good channel condition. Increasing the length of the CSI request field reduces reliability of the scheduling grant command. Meanwhile, it also causes a difficulty in the design of the grant so as to support multiple types of lengths of the CSI request field.

SUMMARY OF THE INVENTION

Embodiments of the present invention provide a method, a user equipment, and a base station for transmitting aperiodic CSI, so that a CSI of a carrier corresponding to a CSI location label may be sent or received without changing a length of an aperiodic CSI request field.

An embodiment of the present invention provides a method for sending CSI, including: receiving a scheduling grant command sent by a base station; obtaining a CSI location label according to information of a resource occupied by the scheduling grant command and/or information of a resource occupied by a data channel that is indicated by the scheduling grant command; and sending CSI of a carrier corresponding to the CSI location label to the base station through the data channel.

An embodiment of the present invention further provides a user equipment for sending CSI, including: a receiving module, configured to receive a scheduling grant command sent by a base station; a CSI location label obtaining module, configured to obtain a CSI location label according to information of a resource occupied by the scheduling grant command and/or information of a resource occupied by a data channel that is indicated by the scheduling grant command, where the scheduling grant command is received by the receiving module; and a sending module, configured to send CSI of a carrier corresponding to the CSI location label to the base station through the data channel, where the CSI location label is obtained by the CSI location label obtaining module.

An embodiment of the present invention provides a method for receiving CSI, including: according to a CSI location label, configuring information of a resource occupied by a scheduling grant command and/or information of a resource occupied by a data channel that is indicated by the scheduling grant command; sending the scheduling grant command to a user equipment; and receiving CSI of a carrier corresponding to the CSI location label, where the CSI is sent by the user equipment through the data channel.

An embodiment of the present invention further provides a base station for receiving CSI, including: a configuring unit, configured to configure, according to a CSI location label, information of a resource occupied by a scheduling grant command and/or information of a resource occupied by a data channel that is indicated by the scheduling grant command; a sending unit, configured to send the scheduling grant command to a user equipment; and a receiving unit, configured to receive CSI of a carrier corresponding to the CSI location label, where the CSI is sent by the user equipment through the data channel.

It can be seen from the preceding technical solutions provided in the embodiments of the present invention that, a CSI location label may be obtained through a scheduling grant command, and CSI of a carrier corresponding to the CSI location label may be sent or received without changing a length of an aperiodic CSI request field. In this way, CSI of a part or all of cells and/or carriers can be triggered flexibly between a user equipment and a base station, and the design of the scheduling grant command is even simplified.

BRIEF DESCRIPTION OF THE DRAWINGS

To describe the technical solutions in the embodiments of the present invention more clearly, the accompanying drawings required for describing the embodiments are briefly introduced in the following. Obviously, the accompanying drawings in the following description are only a plurality of embodiments of the present invention, and persons of ordinary skill in the art may also obtain other drawings according to these accompanying drawings without creative efforts.

DETAILED DESCRIPTION OF ILLUSTRATIVE EMBODIMENTS

The technical solutions in the embodiments of the present invention are described clearly and completely in the following with reference to the accompanying drawings in the embodiments of the present invention. Obviously, the embodiments to be described are only a part rather than all of the embodiments of the present invention. Based on the embodiments of the present invention, all other embodiments obtained by persons of ordinary skill in the art without making any creative effort shall fall within the protection scope of the present invention.

Figure 1:
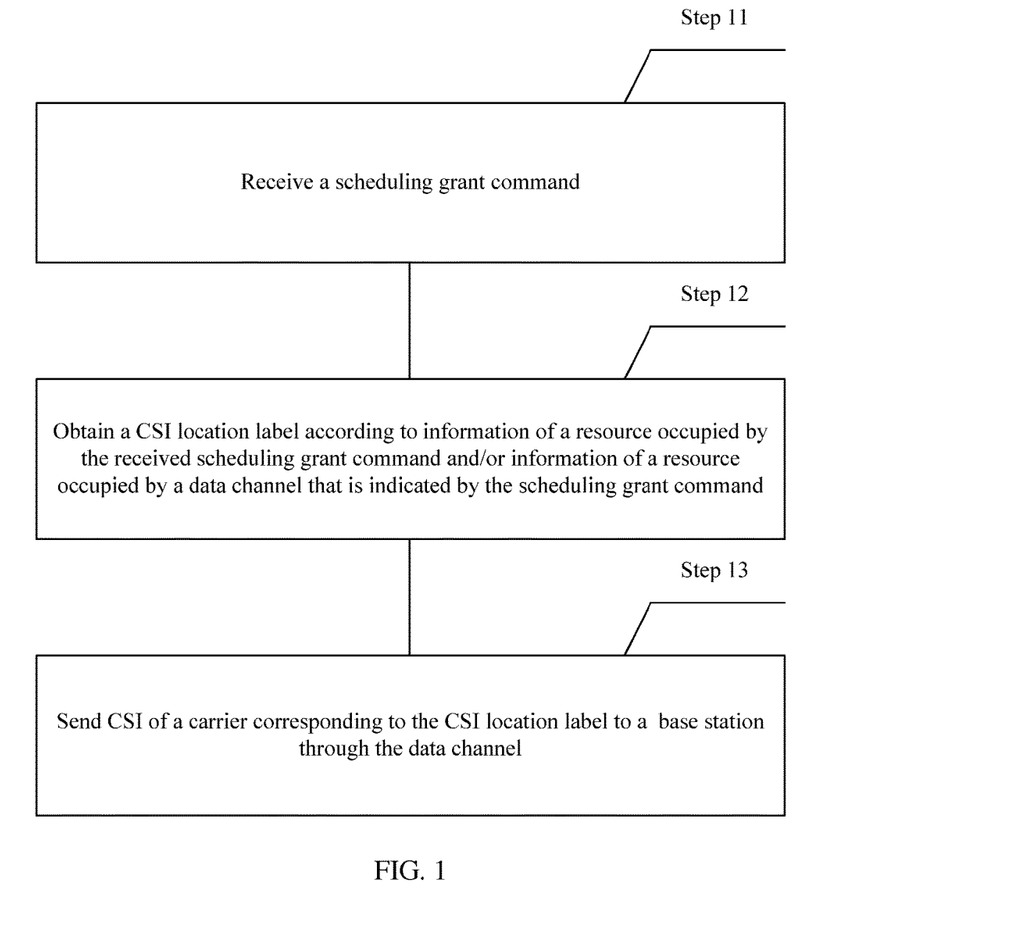
FIG. 1 is a schematic flowchart of a method for sending channel state information according to an embodiment of the present invention.

An embodiment of the present invention provides a method for sending CSI. As shown in FIG. 1 shows the following steps.

Step 11: Receive a scheduling grant command.

Specifically, the scheduling grant may be an uplink scheduling grant or a downlink scheduling grant. However, in this embodiment, an uplink scheduling grant is taken as an example for description. An uplink scheduling grant command may include an index of a physical resource block occupied by data channel transmission, and a CSI request field of aperiodic CSI feedback. A 1-bit CSI request field of the aperiodic CSI feedback is used to indicate whether a user equipment that receives the uplink scheduling grant command needs to send CSI on the data channel or not.

Step 12: Obtain a CSI location label according to information of a resource occupied by the received scheduling grant command and/or information of a resource occupied by a data channel that is indicated by the scheduling grant command.

Specifically, the information of the resource occupied by the scheduling grant command and/or the information of the resource occupied by the data channel that is indicated by the scheduling grant command may include information of time, a frequency domain, space, and a code channel that are occupied by the scheduling grant command, and/or information of time, a frequency domain, space, and a code channel that are occupied by the data channel indicated by the scheduling grant command. For an LTE-A system, the information of the resource occupied by the scheduling grant command and/or the information of the resource occupied by the data channel that is indicated by the scheduling grant command may specifically include at least one of the following parameters: an index of a subframe for receiving the scheduling grant command, an index of a control channel element occupied by the scheduling grant command, an index of a cell for receiving the scheduling grant command, an index of a carrier for receiving the scheduling grant command, an index of a cell where the data channel is located, an index of a carrier where the data channel is located, an index of a physical resource block occupied by the data channel transmission, and an index of a subframe where the data channel is located, for example, may include only an index 5 of the subframe for receiving the scheduling grant command or only an index 1 of the physical resource block occupied by the data channel transmission, or may also include a combination of an index 3 of the subframe for receiving the scheduling grant command and an index 2 of the cell where the data channel is located, where the index 3 plus the index 2 is 5. The combination of two parameters may be any function that uses the two parameters as independent variables. The simplest combination includes addition, subtraction, multiplication, or division. To facilitate description, the following combination of two parameters is described by taking addition of the two parameters as an example. When the scheduling grant command occupies multiple control channel elements, an index of the first or the last control channel element may be selected. In the same way, when the data channel transmission occupies multiple physical resource blocks, an index of the first or the last physical resource block may be selected.

In carrier aggregation, a user equipment may access multiple component carriers concurrently, where the component carriers are generally carriers with different center frequencies of cells at the same geographical location or neighboring locations, and have the same cell index and different carrier indexes. In a CoMP technology, a user equipment may access multiple cells concurrently, where the cells herein are generally cells that have the same center frequency and are located at different geographical locations, and have different cell indexes and the same carrier index. It can be seen that, for the component carriers in the carrier aggregation or cells in the CoMP technology, a smallest identifiable unit is always a carrier of a center frequency of a cell at a geographical location. To facilitate description, the component carriers in the carrier aggregation and the cells in the CoMP are collectively referred to as carriers.

Step 13: Send CSI of a carrier corresponding to the obtained CSI location label to the base station through the data channel.

Specifically, the data channel may be a physical uplink shared channel (PUSCH) or a physical downlink shared channel (PDSCH). In this embodiment, the PUSCH is taken as an example for description.

In the preceding method, in step 12, specifically, the information of the resource occupied by the scheduling grant command and/or the information of the resource occupied by the data channel that is indicated by the scheduling grant command may be used as the CSI location label. For example, the information of the resource occupied by the scheduling grant command and/or the information of the resource occupied by the data channel that is indicated by the scheduling grant command includes the combination of the index 3 of the subframe for receiving the scheduling grant command and the index 2 of the cell where the data channel is located, where the index 3 plus the index 2 is 5, and the CSI location label is 5.

In step 12, a modulo operation by the number of carriers which the user equipment itself accesses is performed on the information of the resource occupied by the scheduling grant command and/or the information of the resource occupied by the data channel that is indicated by the scheduling grant command, and then a modulo operation result may also be used as the CSI location label. For example, the information of the resource occupied by the scheduling grant command and/or the information of the resource occupied by the data channel that is indicated by the scheduling grant command includes the combination of the index 3 of the subframe for receiving the scheduling grant command and the index 2 of the cell where the data channel is located, where the index 3 plus the index 2 is 5. If the number of carriers which the user equipment accesses is 3, a modulo operation result 2 is the CSI location label.

Based on the preceding two implementation methods in step 12, correspondingly, in step 13, CSI of a carrier whose carrier information is equal to the CSI location label may be sent to the base station through the data channel. For example, if an obtained CSI location label is 2, CSI of a carrier 2 is sent to the base station. The carrier information may include a cell index and a carrier index concurrently. For the carrier aggregation, the carrier information may include only a carrier index; and for the CoMP technology, the carrier information may include only a cell index.

Before step 11, step 10 may further be included, that is, receiving higher layer signaling sent by the base station, where the higher layer signaling includes at least one piece of aperiodic CSI feedback indication information, and the aperiodic CSI feedback indication information includes at least one piece of carrier information. Each piece of aperiodic CSI feedback indication information corresponds to an aperiodic CSI feedback indication label. The higher layer signaling may be illustrated in the following table.

| Aperiodic CSI Feedback Indication Label | Carrier Information |
| --- | --- |
| 0 | 2, 3 |
| 1 | 1 |
| 2 | 0 |

When the higher layer signaling is received, in step 12, the information of the resource occupied by the scheduling grant command and/or the information of the resource occupied by the data channel that is indicated by the scheduling grant command may be used as the CSI location label. For example, the information of the resource occupied by the scheduling grant command and/or the information of the resource occupied by the data channel that is indicated by the scheduling grant command includes the combination of the index 3 of the subframe for receiving the scheduling grant command and the index 2 of the cell where the data channel is located, where the index 3 plus the index 2 is 5. Therefore, the CSI location label is 5.

In step 12, specifically, a modulo operation by the number of pieces of aperiodic CSI feedback indication information in the higher layer signaling is performed on the information of the resource occupied by the scheduling grant command and/or the information of the resource occupied by the data channel that is indicated by the scheduling grant command, and then a modulo operation result may also be used as the CSI location label, where the number of pieces of aperiodic CSI feedback indication information may be obtained through the higher layer signaling. For example, the information of the resource occupied by the scheduling grant command and/or the information of the resource occupied by the data channel that is indicated by the scheduling grant command includes the combination of the index 3 of the subframe for receiving the scheduling grant command and the index 2 of the cell where the data channel is located, where the index 3 plus the index 2 is 5. If the number of pieces of aperiodic CSI feedback indication information is 3 like the example in step 10, a modulo operation result 2 is the CSI location label.

In step 12, specifically, a modulo operation by the number of carriers which the user equipment accesses is performed on the information of the resource occupied by the scheduling grant command and/or the information of the resource occupied by the data channel that is indicated by the scheduling grant command, and then a modulo operation result may also be used as the CSI location label. For example, the information of the resource occupied by the scheduling grant command and/or the information of the resource occupied by the data channel that is indicated by the scheduling grant command includes the combination of the index 3 of the subframe for receiving the scheduling grant command and that index 2 of the cell where the data channel is located, where the index 3 plus the index 2 is 5. If the number of carriers which the user equipment accesses is 3, a modulo operation result 2 is the CSI location label.

Based on the preceding three implementation methods in step 12 when the higher layer signaling is received, in step 13, specifically, corresponding aperiodic CSI feedback indication information is obtained through the higher layer signaling according to the aperiodic CSI feedback indication label that is equal to the CSI location label, and a CSI of a carrier corresponding to the carrier information in the obtained aperiodic CSI feedback indication information is sent to the base station through the data channel. For example, the obtained CSI location label is 2. If the carrier information in the aperiodic CSI feedback indication information that corresponds to the aperiodic CSI feedback indication label 2 and is equal to the CSI location label is 0 like the example in step 10, a CSI of a carrier 0 is sent to the base station through the data channel.

Based on the preceding three implementation methods in step 12 when the higher layer signaling is received, in step 13, specifically, carrier information equal to the CSI location label may also be obtained according to the higher layer signaling, and aperiodic CSI feedback indication information corresponding to the carrier information is obtained, and then CSI of a carrier corresponding to the carrier information in the obtained aperiodic CSI feedback indication information is sent to the base station through the data channel. For example, the obtained CSI location label is 2. If the aperiodic CSI feedback indication information that corresponds to carrier information 2 and is equal to the CSI location label in the aperiodic CSI feedback indication information corresponds to an aperiodic CSI feedback indication label 0 like the example in step 10, CSI of carriers 2 and 3 is sent to the base station through the data channel. At this time, a preferred implementation method in step 12 may also be: using the index of the carrier for receiving the scheduling grant command, the index of the cell for receiving the scheduling grant command, the index of the carrier where the data channel is located, or the index of the cell where the data channel is located as the CSI location label.

In step 10, aperiodic CSI feedback is configured through higher layer signaling for the carriers which the user equipment itself accesses. The higher layer signaling may be radio resource control (RRC) signaling delivered by the base station, or may be medium access control (MAC) signaling delivered by the base station. In an LTE-A system, the base station notifies a user equipment of a carrier set through the RRC signaling according to a hardware capability and a data service requirement of the user equipment, where all possible carriers that the user equipment may access are provided. The base station may also activate or deactivate a carrier in the carrier set through the MAC signaling. When the higher layer signaling is the RRC signaling delivered by the base station, the carriers which the user equipment itself accesses may be all the carriers in the carrier set notified through the RRC signaling. When the higher layer signaling is the MAC signaling, the carriers which the user equipment itself accesses may be all the carriers that are currently activated. When aperiodic CSI feedback is configured through the higher layer signaling for the carriers which the user equipment itself accesses, aperiodic CSI feedback may be configured for all of the carriers which the user equipment itself accesses; or aperiodic CSI feedback may be configured only for a part of the carriers which the user equipment itself accesses.

In step 13, CSI of a carrier corresponding to the carrier information in the obtained aperiodic CSI feedback indication information is sent to the base station through the data channel. The carrier corresponding to the carrier information in the aperiodic CSI feedback indication information may be all carriers that correspond to the carrier information in the aperiodic CSI feedback indication information. In the LTE-A system, for a carrier in a deactivated state, the user equipment does not need to feed back CSI to the base station, and therefore, the carrier corresponding to the carrier information in the aperiodic CSI feedback indication information may be all carriers in an activated state, where the all carriers in an activated state correspond to the carrier information in the aperiodic CSI feedback indication information.

If the scheduling grant command received in step 11 further includes CSI carrier selection information, the preceding two kinds of step 13 may further include: selecting at least one piece of carrier information in the aperiodic CSI feedback indication information according to the CSI carrier selection information, and sending CSI of a carrier corresponding to the selected carrier information to the base station through the data channel. In the LTE-A system, for the user equipment that accesses multiple carriers concurrently, an uplink scheduling grant command of the user equipment may include a 3-bit carrier indicator field (CIF) that is used to indicate that a PUSCH scheduled by the uplink scheduling grant command is sent in which specific uplink carrier. Generally, the number of uplink carriers concurrently which the user equipment accesses for data transmission is smaller, for example, not more than 2, and the CIF may have a plurality of redundant bits or redundant states. Therefore, the CIF may be used to indicate an uplink carrier where the PUSCH is located and the CSI carrier selection information. For example, when the number of uplink carriers which the user equipment accesses is 2, 1 bit in the 3-bit CIF is used to indicate that the scheduled PUSCH is sent in which uplink carrier, and the remaining 2 bits may be used as the CSI carrier selection information. If the carrier information in the aperiodic CSI feedback indication information is 0 and 1 and 2-bit CSI carrier selection information in the received scheduling grant command is used to indicate selection of a carrier 0, then only CSI of the carrier 0 is sent to the base station this time.

Figure 2:
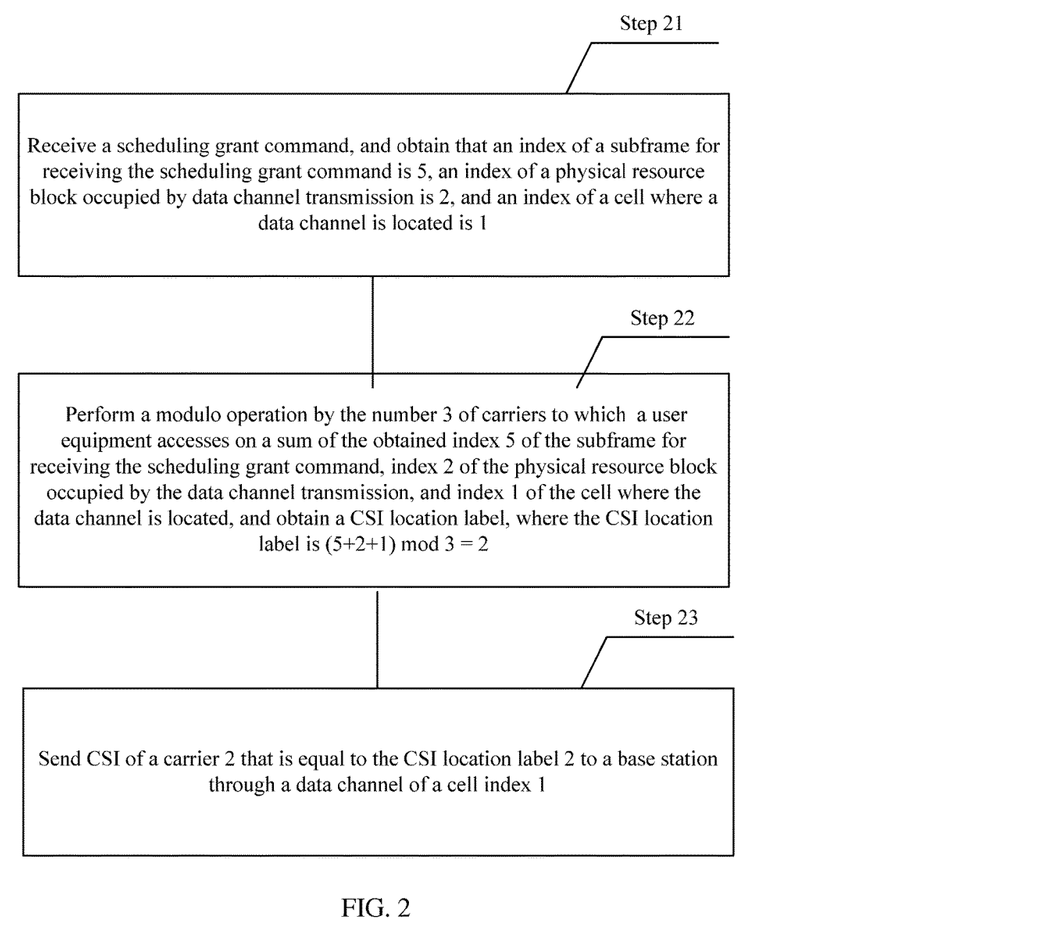
FIG. 2 is a schematic flowchart of another method for sending channel state information according to an embodiment of the present invention.

As shown in FIG. 2, by taking the following as an example: the number of carriers which the user equipment itself accesses is 3; the index of the subframe for receiving the scheduling grant command is 5; the index of the physical resource block occupied by the data channel transmission is 2; the index of the cell where the data channel is located is 1; a modulo operation by the number 3 of carriers which the user equipment itself accesses is performed on a sum of the index of the subframe for receiving the scheduling grant command, the index of the physical resource block occupied by the data channel transmission, and the index of the cell where the data channel is located; and a modulo operation result is used as a CSI location label, the preceding method is described specifically.

Step 21: Receive a scheduling grant command, and obtain that an index of a subframe for receiving the scheduling grant command is 5, an index of a physical resource block occupied by data channel transmission is 2, and an index of a cell where a data channel is located is 1.

Step 22: Perform a modulo operation by the number 3 of carriers which the user equipment accesses on a sum of the obtained index 5 of the subframe for receiving the scheduling grant command, index 2 of the physical resource block occupied by the data channel transmission, and index 1 of the cell where the data channel is located to obtain a CSI location label, where the CSI location label is (5+2+1) mod 3=2.

Step 23: Send CSI of a carrier 2 that is equal to the CSI location label 2 to the base station through a data channel of a cell index 1.

It is understandable to persons of ordinary skill in the art that all or a part of the processes in the methods in the preceding embodiments may be completed by a computer program instructing related hardware. The program may be stored in a computer readable storage medium. When the program runs, the processes of the methods in the preceding embodiments are executed. The storage medium may be a magnetic disk, a compact disk, a read-only memory (ROM), or a random access memory (RAM) and so on.

Figure 3:
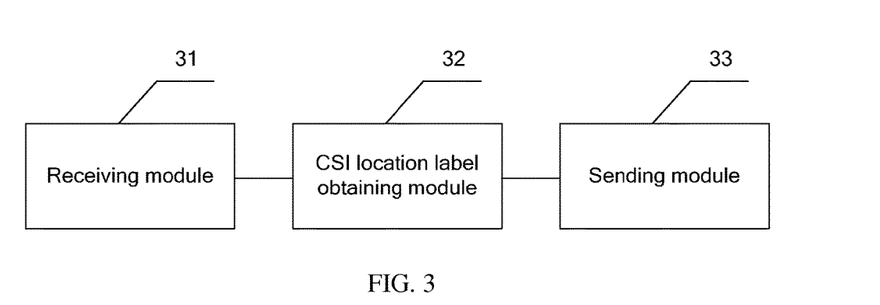
FIG. 3 is a schematic structural diagram of a user equipment for sending channel state information according to an embodiment of the present invention.

An embodiment of the present invention further provides a user equipment for sending channel state information. As shown in FIG. 3, the user equipment includes:

A receiving module 31 is configured to receive a scheduling grant command sent by a base station.

Specifically, the scheduling grant command may be an uplink scheduling grant command, or may be a downlink scheduling grant command. However, in this embodiment, the uplink scheduling grant command is taken as an example for description. An index of a physical resource block occupied by data channel transmission and a CSI request field of aperiodic CSI feedback may be included. A 1-bit CSI request field of the aperiodic CSI feedback is used to indicate whether the user equipment that receives the uplink scheduling grant command needs to send CSI on the data channel.

A CSI location label obtaining module 32 is configured to obtain a CSI location label according to information of a resource occupied by the scheduling grant command and/or information of a resource occupied by a data channel that is indicated by the scheduling grant command, where the scheduling grant command is received by the receiving module 31.

Specifically, the information of the resource occupied by the scheduling grant command and/or the information of the resource occupied by the data channel that is indicated by the scheduling grant command may include information of time, a frequency domain, space, and a code channel that are occupied by the scheduling grant command, and/or information of time, a frequency domain, space, and a code channel that are occupied by the data channel that is indicated by the scheduling grant command. For an LTE-A system, the information of the resource occupied by the scheduling grant command and/or the information of the resource occupied by the data channel that is indicated by the scheduling grant command may specifically include at least one of the following parameters: an index of a subframe for receiving the scheduling grant command, an index of a control channel element occupied by the scheduling grant command, an index of a cell for receiving the scheduling grant command, an index of a carrier for receiving the scheduling grant command, an index of a cell where the data channel is located, an index of a carrier where the data channel is located, an index of the physical resource block occupied by the data channel transmission, and an index of a subframe where the data channel is located, for example, may include only an index 5 of the subframe for receiving the scheduling grant command or include only an index 1 of the physical resource block occupied by the data channel transmission, or may include a combination of an index 3 of the subframe for receiving the scheduling grant command and an index 2 of the cell where the data channel is located, where the index 3 plus the index 2 is 5. The combination of two parameters may be any function that uses the two parameters as independent variables. The simplest combination includes addition, subtraction, multiplication, or division. To facilitate description, the following combination of the two parameters is described by taking addition of the two parameters as an example. When the scheduling grant command occupies multiple control channel elements, an index of the first or the last control channel element may be selected. In the same way, when the data channel transmission occupies multiple physical resource blocks, an index of the first or the last physical resource block may be selected.

A sending module 33 is configured to send CSI of a carrier corresponding to the CSI location label to the base station through the data channel, where the CSI location label is obtained by the CSI location label obtaining module 32, and the data channel may be a PUSCH or a PDSCH. In this embodiment, the PUSCH is taken as an example for description.

In the preceding apparatus, the CSI location label obtaining module 32 may specifically be configured to use the information of the resource occupied by the scheduling grant command and/or the information of the resource occupied by the data channel that is indicated by the scheduling grant command as the CSI location label. For example, the information of the resource occupied by the scheduling grant command and/or the information of the resource occupied by the data channel that is indicated by the scheduling grant command includes a combination of the index 3 of the subframe for receiving the scheduling grant command and the index 2 of the cell where the data channel is located, where the index 3 plus the index 2 is 5. Therefore, the CSI location label is 5.

Alternatively, the CSI location label obtaining module 32 may further be configured to perform a modulo operation by the number of carriers which the user equipment itself accesses on the information of the resource occupied by the scheduling grant command and/or the information of the resource occupied by the data channel that is indicated by the scheduling grant command, and then use a modulo operation result as the CSI location label. For example, the information of the resource occupied by the scheduling grant command and/or the information of the resource occupied by the data channel that is indicated by the scheduling grant command includes the combination of the index 3 of the subframe for receiving the scheduling grant command and the index 2 of the cell where the data channel is located, where the index 3 plus the index 2 is 5. If the number of carriers which the user equipment accesses is 3, a modulo operation result 2 is the CSI location label.

Based on the function implemented by the CSI location label obtaining module 32, the sending module 33 may send CSI of a carrier whose carrier information is equal to the CSI location label to the base station through the data channel. For example, if an obtained CSI location label is 2, a CSI of a carrier 2 is sent to the base station. The carrier information may include a cell index and a carrier index concurrently. For carrier aggregation, only the carrier index may be included; and for CoMP, only the cell index may be included.

In the preceding apparatus, if the receiving module 31 is further configured to receive higher layer signaling sent by the base station, the higher layer signaling includes at least one piece of aperiodic CSI feedback indication information, where the aperiodic CSI feedback indication information includes at least one piece of carrier information. Each piece of aperiodic CSI feedback indication information corresponds to one aperiodic CSI feedback indication label. Specifically, the higher layer signaling may be illustrated in the following table.

| Aperiodic CSI Feedback Indication Label | Carrier Information |
| --- | --- |
| 0 | 2, 3 |
| 1 | 1 |
| 2 | 0 |

The CSI location label obtaining module 32 may specifically be configured to use the information of the resource occupied by the scheduling grant command and/or the information of the resource occupied by the data channel that is indicated by the scheduling grant command as the CSI location label. For example, the information of the resource occupied by the scheduling grant command and/or the information of the resource occupied by the data channel that is indicated by the scheduling grant command includes the combination of the index 3 of the subframe for receiving the scheduling grant command and the index 2 of the cell where the data channel is located, where the index 3 plus the index 2 is 5. Therefore, the CSI location label is 5.

Alternatively, the CSI location label obtaining module 32 may further be configured to perform a modulo operation by the number of pieces of the aperiodic CSI feedback indication information in the higher layer signaling on the information of the resource occupied by the scheduling grant command and/or the information of the resource occupied by the data channel that is indicated by the scheduling grant command, and then use a modulo operation result as the CSI location label, where the number of pieces of the aperiodic CSI feedback indication information may be obtained through the higher layer signaling. For example, the information of the resource occupied by the scheduling grant command and/or the information of the resource occupied by the data channel that is indicated by the scheduling grant command includes the combination of the index 3 of the subframe for receiving the scheduling grant command and the index 2 of the cell where the data channel is located, where the index 3 plus the index 2 is 5. If the number of pieces of the aperiodic CSI feedback indication information is 3 like the example in step 10, a modulo operation result 2 is the CSI location label.

Alternatively, the CSI location label obtaining module 32 may further be configured to perform a modulo operation by the number of carriers which the user equipment itself accesses on the information of the resource occupied by the scheduling grant command and/or the information of the resource occupied by the data channel that is indicated by the scheduling grant command, and then use a modulo operation result as the CSI location label. For example, the information of the resource occupied by the scheduling grant command and/or the information of the resource occupied by the data channel that is indicated by the scheduling grant command includes the combination of the index 3 of the subframe for receiving the scheduling grant command and the index 2 of the cell where the data channel is located, where the index 3 plus the index 2 is 5. If the number of the carriers which the user equipment accesses is 3, a modulo operation result 2 is the CSI location label.

Based on the preceding function implemented by the CSI location label obtaining module 32, the sending module 33 may specifically be configured to obtain corresponding aperiodic CSI feedback indication information through the higher layer signaling according to the aperiodic CSI feedback indication label that is equal to the CSI location label, and send CSI of a carrier corresponding to the carrier information in the obtained aperiodic CSI feedback indication information to the base station through the data channel. For example, the obtained CSI location label is 2. If the carrier information in the aperiodic CSI feedback indication information that corresponds to an aperiodic CSI feedback indication label 2 and is equal to the CSI location label is 0 like the example in step 10, CSI of a carrier 0 is sent to the base station through the data channel.

Alternatively, the sending module 33 may specifically further be configured to obtain carrier information that is equal to the CSI location label according to the higher layer signaling, obtain aperiodic CSI feedback indication information that corresponds to the carrier information, and send CSI of a carrier corresponding to the carrier information in the obtained aperiodic CSI feedback indication information to the base station through the data channel. For example, the obtained CSI location label is 2. If in the aperiodic CSI feedback indication information, the aperiodic CSI feedback indication information corresponding to carrier information 2 that is equal to the CSI location label is an aperiodic CSI feedback indication label 0 like the example in step 10, CSI of carriers 2 and 3 is sent to the base station through the data channel. At this time, the CSI location label obtaining module 32 may also use the index of the carrier for receiving the scheduling grant command, the index of the cell for receiving the scheduling grant command, the index of the carrier where the data channel is located, or the index of the cell where the data channel is located as the CSI location label.

When the scheduling grant command received by the receiving module 31 further includes CSI carrier selection information, the preceding sending module 33 may further be configured to select at least one piece of carrier information in the aperiodic CSI feedback indication information according to the CSI carrier selection information, and send CSI of a carrier corresponding to the selected carrier information to the base station through the data channel. In the LTE-A system, for the user equipment that accesses multiple carriers concurrently, the uplink scheduling grant command of the user equipment may include a 3-bit CIF that is used to indicate that the PUSCH scheduled by the uplink scheduling grant command is sent in which specific uplink carrier. Generally, the number of uplink carriers which the user equipment concurrently accesses for data transmission is smaller, for example, not more than 2, and the CIF may have a plurality of redundant bits or redundant states. Therefore, the CIF may be used to indicate an uplink carrier where the PUSCH is located and the CSI carrier selection information. For example, when the number of uplink carriers which the user equipment accesses is 2, 1 bit in the 3-bit CIF is used to indicate that the scheduled PUSCH is sent in which uplink carrier, and the remaining 2 bits may be used as the CSI carrier selection information. If the carrier information in periodic CSI feedback indication information is 0 and 1, and 2-bit CSI carrier selection information in the received scheduling grant command is used to indicate selection of a carrier 0, only CSI of the carrier 0 is sent to the base station this time.

The processing functions of each module included in the preceding apparatus have been described in the preceding method embodiment, and are not further described repeatedly.

In this embodiment of the present invention, the CSI location label may be obtained through the higher layer signaling and/or the scheduling grant command, and the CSI of the carrier corresponding to the CSI location label may be sent to the base station without changing a length of an aperiodic CSI request field. In this way, CSI of a part or all of cells and/or carriers can be triggered flexibly between the user equipment and the base station, and the design of the scheduling grant command is simplified.

Figure 4:
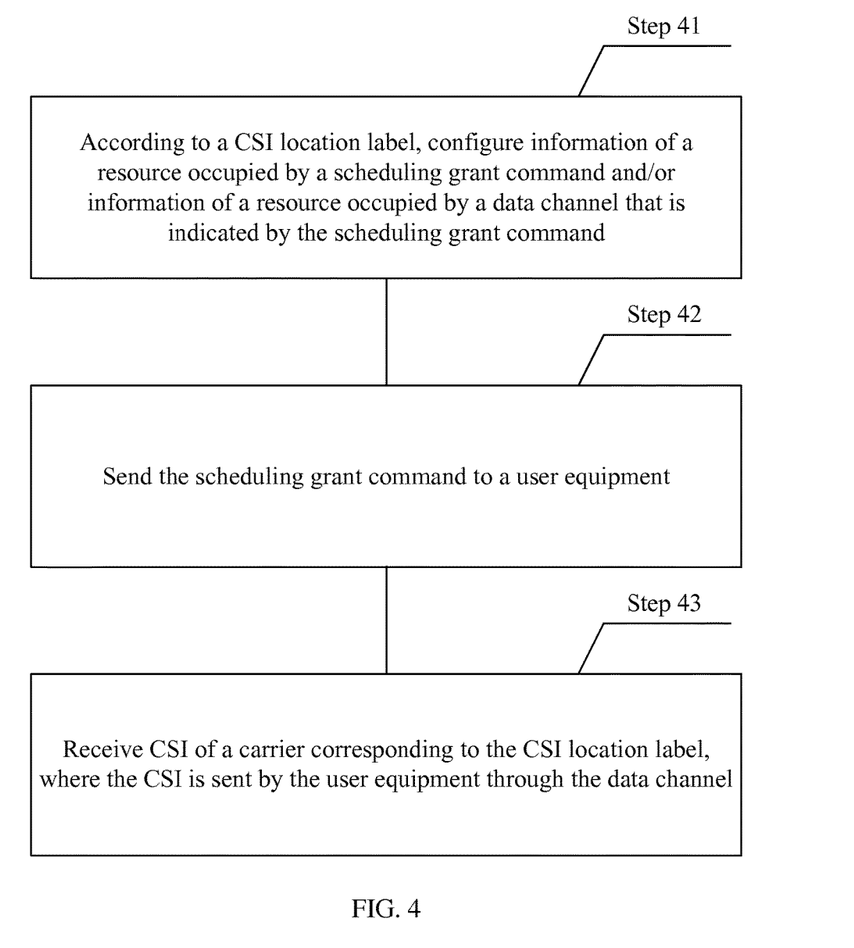
FIG. 4 is a schematic flowchart of a method for receiving channel state information according to an embodiment of the present invention.

An embodiment of the present invention further provides a method for receiving channel state information. As shown in FIG. 4, the method includes:

Step 41: According to a CSI location label, configure information of a resource occupied by a scheduling grant command and/or information of a resource occupied by a data channel that is indicated by the scheduling grant command.

Before step 41, the CSI location label may be obtained according to carrier information of a carrier that is to receive CSI. Specifically, the carrier information may be used as the CSI location label directly.

Furthermore, the scheduling grant command may be an uplink scheduling grant command, or may be a downlink scheduling grant command. However, in this embodiment, the uplink scheduling grant command is taken as an example for description. The uplink scheduling grant command may include an index of a physical resource block occupied by data channel transmission and a CSI request field of aperiodic CSI feedback. The CSI request field of the aperiodic CSI feedback is used to indicate whether a user equipment that receives the uplink scheduling grant command needs to send CSI on the data channel. A length of the CSI request field is 1 bit.

The information of the resource occupied by the scheduling grant command and/or the information of the resource occupied by the data channel that is indicated by the scheduling grant command may include information of time, a frequency domain, space, and a code channel that are occupied by the scheduling grant command, and/or information of time, a frequency domain, space, and a code channel that are occupied by the data channel indicated by the scheduling grant command. For an LTE-A system, the information of the resource occupied by the scheduling grant command and/or the information of the resource occupied by the data channel that is indicated by the scheduling grant command may specifically include at least one of the following parameters: an index of a subframe for sending the scheduling grant command, an index of a control channel element occupied by the scheduling grant command, an index of a cell for sending the scheduling grant command, an index of a carrier for sending the scheduling grant command, an index of a cell where the data channel is located, an index of a carrier where the data channel is located, an index of a physical resource block occupied by the data channel transmission, and an index of a subframe where the data channel is located, for example, may include only an index 5 of the subframe for sending the scheduling grant command, or only an index 1 of the physical resource block occupied by the data channel transmission, or may include a combination of an index 3 of the subframe for sending the scheduling grant command and an index 2 of the cell where the data channel is located, where the combination of the index 3 and the index 2, that is, 3+2=5.

Specifically, the information of the resource occupied by the scheduling grant command and/or the information of the resource occupied by the data channel is configured, so that the information of the resource occupied by the scheduling grant command and/or the information of the resource occupied by the data channel is equal to the CSI location label. For example, the CSI location label is 5. If the information of the resource occupied by the scheduling grant command and/or the information of the resource occupied by the data channel that is indicated by the scheduling grant command includes a combination of the index of the subframe for sending the scheduling grant command and the index of the cell where the data channel is located, the index of the subframe for sending the scheduling grant command may be configured as 3, and the index of the cell where the data channel is located may be configured as 2, where the combination of the index 3 and the index 2, that is, 3+2=5.

Alternatively, the information of the resource occupied by the scheduling grant command and/or the information of the resource occupied by the data channel is configured, to make a modulo operation result be equal to the CSI location label, where the modulo operation result is obtained by performing a modulo operation by the number of carriers which the user equipment accesses on the information of the resource occupied by the scheduling grant command and/or the information of the resource occupied by the data channel. For example, the CSI location label is 2, and the number of the carriers which the user equipment accesses is 3. If the information of the resource occupied by the scheduling grant command and/or the information of the resource occupied by the data channel that is indicated by the scheduling grant command includes a combination of the index of the subframe for sending the scheduling grant command and the index of the cell where the data channel is located, the index of the subframe for sending the scheduling grant command may be configured as 2, and the index of the cell where the data channel is located may be configured as 3, where the combination of the index 2 and the index 3, that is, 3+2=5.

Step 42: Send the scheduling grant command to the user equipment.

Step 43: Receive CSI of a carrier corresponding to the CSI location label, where the CSI is sent by the user equipment through the data channel.

In the preceding method, higher layer signaling may also be sent to the user equipment, where the higher layer signaling includes at least one piece of aperiodic CSI feedback indication information, where the aperiodic CSI feedback indication information includes at least one piece of carrier information. Each piece of aperiodic CSI feedback indication information corresponds to an aperiodic CSI feedback indication label, for example:

| Aperiodic CSI Feedback Indication Label | Carrier Information |
| --- | --- |
| 0 | 2, 3 |
| 1 | 1 |
| 2 | 0 |

Based on the preceding method, the obtaining a CSI location label according to carrier information of a carrier that is to receive a CSI in step 41 may specifically further be: obtaining an aperiodic CSI feedback indication label through the higher layer signaling according to the carrier information of the carrier that is to receive the CSI, and using the aperiodic CSI feedback indication label as the CSI location label; or using carrier information of any one carrier among the carriers that are to receive the CSI as the CSI location label.

Furthermore, in step 41, the information of the resource occupied by the scheduling grant command and/or the information of the resource occupied by the data channel may specifically be configured, to make the information of the resource occupied by the scheduling grant command and/or the information of the resource occupied by the data channel be equal to the CSI location label. For example, the CSI location label is 5. If the information of the resource occupied by the scheduling grant command and/or the information of the resource occupied by the data channel that is indicated by the scheduling grant command includes a combination of the index of the subframe for sending the scheduling grant command and the index of the cell where the data channel is located, the index of the subframe for sending the scheduling grant command may be configured as 3, and the index of the cell where the data channel is located may be configured as 2, where the combination of the index 3 and the index 2, that is, 3+2=5.

Alternatively, the information of the resource occupied by the scheduling grant command and/or the information of the resource occupied by the data channel may specifically be configured, to make a modulo operation result be equal to the CSI location label, where the modulo operation result is obtained by performing a modulo operation by the number of carriers which the user equipment accesses on the information of the resource occupied by the scheduling grant command and/or the information of the resource occupied by the data channel. For example, the CSI location label is 2, and the number of the carriers which the user equipment accesses is 3. If the information of the resource occupied by the scheduling grant command and/or the information of the resource occupied by the data channel that is indicated by the scheduling grant command includes a combination of the index of the subframe for sending the scheduling grant command and the index of the cell where the data channel is located, the index of the subframe for sending the scheduling grant command may be configured as 2, and the index of the cell where the data channel is located may be configured as 3, where the combination of the index 2 and the index 3, that is, 3+2=5.

Alternatively, the information of the resource occupied by the scheduling grant command and/or the information of the resource occupied by the data channel is specifically configured, to make a modulo operation result be equal to the CSI location label, where the modulo operation result is obtained by performing a modulo operation by the number of pieces of aperiodic CSI feedback indication information in the higher layer signaling on the information of the resource occupied by the scheduling grant command and/or the information of the resource occupied by the data channel. For example, the CSI location label is 2, and the number of pieces of the aperiodic CSI feedback indication information is 3. If the information of the resource occupied by the scheduling grant command and/or the information of the resource occupied by the data channel that is indicated by the scheduling grant command includes a combination of the index of the subframe for sending the scheduling grant command and the index of the cell where the data channel is located, the index of the subframe for sending the scheduling grant command may be configured as 3, and the index of the cell where the data channel is located may be configured as 2, where the combination of the index 3 and the index 2, that is, 3+2=5.

In the preceding method, the scheduling grant command may further include CSI carrier selection information. For example, an aperiodic CSI feedback indication label 0 in the preceding table corresponds to carrier information 2 and 3, that is, the user equipment is required to send CSI of carriers 2 and 3. If the user equipment is required to send only the CSI of the carrier 2 this time, the CSI carrier selection information is written as "2". After the user equipment receives the selection information, the user equipment sends only the CSI of the carrier 2 to the base station.

Figure 5:
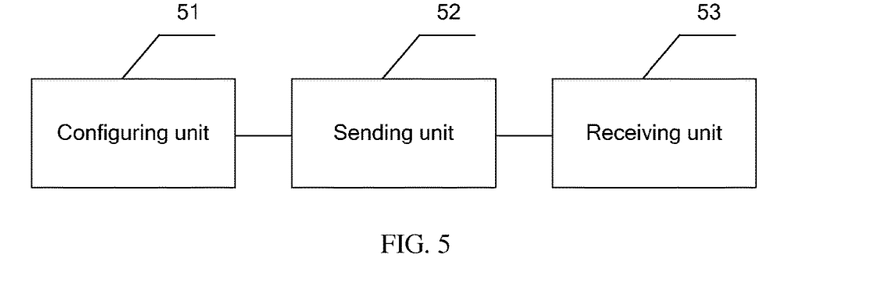
FIG. 5 is a schematic structural diagram of a base station for receiving channel state information according to an embodiment of the present invention.

An embodiment of the present invention further provides a base station for receiving channel state information. As shown in FIG. 5, the base station includes:

A configuring unit 51 is configured to configure, according to a CSI location label, information of a resource occupied by a scheduling grant command and/or information of a resource occupied by a data channel that is indicated by the scheduling grant command.

Previously, a CSI location label may also be obtained according to carrier information of a carrier that is to receive CSI. Specifically, the carrier information may be used as the CSI location label directly.

Furthermore, the scheduling grant command may be an uplink scheduling grant command, or may be a downlink scheduling grant command. However, in this embodiment, the uplink scheduling grant command is taken as an example for description. The uplink scheduling grant command may include an index of a physical resource block occupied by data channel transmission, and a CSI request field of aperiodic CSI feedback. The CSI request field of the aperiodic CSI feedback is used to indicate whether a user equipment that receives the uplink scheduling grant command needs to send CSI on the data channel. A length of the CSI request field is 1 bit.

The information of the resource occupied by the scheduling grant command and/or the information of the resource occupied by the data channel that is indicated by the scheduling grant command may include information of time, a frequency domain, space, and a code channel that are occupied by the scheduling grant command, and/or information of time, a frequency domain, space, and a code channel that are occupied by the data channel indicated by the scheduling grant command. For an LTE-A system, the information of the resource occupied by the scheduling grant command and/or the information of the resource occupied by the data channel that is indicated by the scheduling grant command may specifically include at least one of the following parameters: an index of a subframe for sending the scheduling grant command, an index of a control channel element occupied by the scheduling grant command, an index of a cell for sending the scheduling grant command, an index of a carrier for sending the scheduling grant command, an index of a cell where the data channel is located, an index of a carrier where the data channel is located, an index of a physical resource block occupied by the data channel transmission, and an index of a subframe where the data channel is located, for example, may include only an index 5 of the subframe for sending the scheduling grant command, or only an index 1 of the physical resource block occupied by the data channel transmission, or may include a combination of an index 3 of the subframe for sending the scheduling grant command and an index 2 of the cell where the data channel is located, where the combination of the index 3 and the index 2, that is, 3+2=5.

Specifically, the configuring unit 51 is configured to configure the information of the resource occupied by the scheduling grant command and/or the information of the resource occupied by the data channel, to make the information of the resource occupied by the scheduling grant command and/or the information of the resource occupied by the data channel be equal to the CSI location label. For example, the CSI location label is 5. If the information of the resource occupied by the scheduling grant command and/or the information of the resource occupied by the data channel that is indicated by the scheduling grant command includes a combination of the index of the subframe for sending the scheduling grant command and the index of the cell where the data channel is located, the index of the subframe for sending the scheduling grant command may be configured as 3, and the index of the cell where the data channel is located may be configured as 2, where the combination of the index 3 and the index 2, that is, 3+2=5.

Alternatively, the configuring unit 51 is configured to configure the information of the resource occupied by the scheduling grant command and/or the information of the resource occupied by the data channel, to make a modulo operation result be equal to the CSI location label, where the modulo operation result is obtained by performing a modulo operation by the number of carriers which the user equipment accesses on the information of the resource occupied by the scheduling grant command and/or the information of the resource occupied by the data channel. For example, the CSI location label is 2, and the number of the carriers which the user equipment accesses is 3. If the information of the resource occupied by the scheduling grant command and/or the information of the resource occupied by the data channel that is indicated by the scheduling grant command includes a combination of the index of the subframe for sending the scheduling grant command and the index of the cell where the data channel is located, the index of the subframe for sending the scheduling grant command may be configured as 2, and the index of the cell where the data channel is located may be configured as 3, where the combination of the index 2 and the index 3, that is, 3+2=5.

A sending unit 52 is configured to send the scheduling grant command to the user equipment.

A receiving unit 53 is configured to receive CSI of a carrier corresponding to the CSI location label, where the CSI is sent by the user equipment through the data channel.

In the preceding apparatus, the sending unit 52 may further send higher layer signaling to the user equipment, where the higher layer signaling includes at least one piece of aperiodic CSI feedback indication information, and the aperiodic CSI feedback indication information includes at least one piece of carrier information. Each piece of aperiodic CSI feedback indication information corresponds to an aperiodic CSI feedback indication label, for example:

| Aperiodic CSI Feedback Indication Label | Carrier Information |
|---|---|
| 0 | 2, 3 |
| 1 | 1 |
| 2 | 0 |

Based on the preceding sending unit 52, according to the carrier information of the carrier that is to receive the CSI, that the configuring unit 51 obtains the CSI location label may specifically be: according to the carrier information of the carrier that is to receive the CSI, obtaining an aperiodic CSI feedback indication label through the higher layer signaling, and using the aperiodic CSI feedback indication label as the CSI location label; or using carrier information of any one carrier among the carriers that are to receive the CSI as the CSI location label.

Furthermore, the configuring unit 51 is specifically configured to configure the information of the resource occupied by the scheduling grant command and/or the information of the resource occupied by the data channel, to make the information of the resource occupied by the scheduling grant command and/or the information of the resource occupied by the data channel be equal to the CSI location label. For example, the CSI location label is 5. If the information of the resource occupied by the scheduling grant command and/or the information of the resource occupied by the data channel that is indicated by the scheduling grant command includes a combination of the index of the subframe for sending the scheduling grant command and the index of the cell where the data channel is located, the index of the subframe for sending the scheduling grant command may be configured as 3, and the index of the cell where the data channel is located may be configured as 2, where the combination of the index 3 and the index 2, that is, 3+2=5.

Alternatively, the configuring unit 51 is specifically configured to configure the information of the resource occupied by the scheduling grant command and/or the information of the resource occupied by the data channel, to make a modulo operation result be equal to the CSI location label, where the modulo operation result is obtained by performing a modulo operation by the number of carriers which the user equipment accesses on the information of the resource occupied by the scheduling grant command and/or the information of the resource occupied by the data channel. For example, the CSI location label is 2, and the number of the carriers which the user equipment accesses is 3. If the information of the resource occupied by the scheduling grant command and/or the information of the resource occupied by the data channel that is indicated by the scheduling grant command includes a combination of the index of the subframe for sending the scheduling grant command and the index of the cell where the data channel is located, the index of the subframe for sending the scheduling grant command may be configured as 2, and the index of the cell where the data channel is located may be configured as 3, where the combination of the index 2 and the index 3, that is, 3+2=5.

Alternatively, the configuring unit 51 is specifically configured to configure the information of the resource occupied by the scheduling grant command and/or the information of the resource occupied by the data channel, to make a modulo operation result be equal to the CSI location label, where the modulo operation result is obtained by performing a modulo operation by the number of pieces of aperiodic CSI feedback indication information in the higher layer signaling on the information of the resource occupied by the scheduling grant command and/or the information of the resource occupied by the data channel. For example, the CSI location label is 2, and the number of pieces of the aperiodic CSI feedback indication information is 3. If the information of the resource occupied by the scheduling grant command and/or the information of the resource occupied by the data channel that is indicated by the scheduling grant command includes a combination of the index of the subframe for sending the scheduling grant command and the index of the cell where the data channel is located, the index of the subframe for sending the scheduling grant command is configured as 3, and the index of the cell where the data channel is located is configured as 2, where the combination of the index 3 and the index 2, that is, 3+2=5.

In the preceding apparatus, the scheduling grant command configured by the configuring unit may further include CSI carrier selection information. For example, an aperiodic CSI feedback indication label 0 in the preceding table corresponds to carrier information 2 and 3, that is, the user equipment is required to send CSI of carriers 2 and 3. If the user equipment is required to send only the CSI of the carrier 2 this time, the CSI carrier selection information is written as "2". After the user equipment receives the selection information, the user equipment sends only the CSI of the carrier 2 to the base station.

The specific implementation of processing functions of each unit included in the preceding base station have been described in the preceding method embodiment, and are not further described repeatedly.

In this embodiment of the present invention, by configuring the scheduling grant command and/or the data channel that is indicated by the scheduling grant command through the CSI location label, the CSI of the carrier corresponding to the CSI location label may be received without changing the length of the aperiodic CSI request field, where the CSI is sent by the user equipment. In this way, CSI of a part or all of cells and/or carriers may be triggered flexibly between the user equipment and the base station, and the design of the scheduling grant command is simplified.

With reference to the user equipment and the base station, an interaction relationship between the user equipment and the base station is specifically described in the following by taking corresponding transmitted aperiodic channel state information in the following table as an example.

Situation 1: In the following table, when the number (3) of pieces of configured aperiodic CSI feedback indication information is equal to the number (3) of carriers that correspond to CSI that needs to be fed back,

| Aperiodic CSI Feedback Indication Label | Carrier Information |
|---|---|
| 0 | 2 |
| 1 | 1 |
| 2 | 0 | multiple kinds of configuration modes may exist. In this embodiment, only the following configuration mode is taken as an example for description.

Firstly, according to a CSI location label, the base station configures the information of the resource occupied by the scheduling grant command and/or the information of the resource occupied by the data channel. For example, according to the CSI location label 2, the information of the resource occupied by the scheduling grant command and/or the information of the resource occupied by the data channel is configured. If the configured information of the resource occupied by the scheduling grant command and/or the information of the resource occupied by the data channel includes: using a configured index of the physical resource block occupied by the data channel transmission and the index of the subframe where the data channel is located as the CSI location label, respectively, the index of the physical resource block occupied by the data channel transmission in the scheduling grant command may be configured as 1, and the index of the subframe where the data channel is located may be configured as 1.

Secondly, the user equipment receives the scheduling grant command, and obtains the CSI location label according to the information of the resource occupied by the received scheduling grant command and/or the information of the resource occupied by the data channel that is indicated by the scheduling grant command. For example, if a sum of an index 1 of the physical resource block occupied by the data channel transmission and an index 1 of the subframe where the data channel is located is used as the CSI location label, the obtained CSI location label is 2.

Thirdly, CSI of a carrier 2 that is equal to the CSI location label 2 is sent to the base station through the data channel.

Finally, the base station receives the CSI of the carrier 2.

Situation 2: In the following table, when the number (3) of pieces of configured aperiodic CSI feedback indication information is not equal to the number (4) of carriers corresponding to CSI that needs to be fed back,

| Aperiodic CSI Feedback Indication Label | Carrier Information |
|---|---|
| 0 | 2 |
| 1 | 1, 3 |
| 2 | 0 | multiple kinds of configuration modes may exist. In this embodiment, only the following configuration modes are taken as examples for description.

Configuration Mode 1:

Firstly, the base station configures the higher layer signaling and the scheduling grant command according to the CSI location label, where the higher layer signaling includes information in the table in the situation 2, that is, aperiodic CSI feedback indication labels 0, 1, and 2 and corresponding carrier information 2, 1, 3, and 0, and the number 3 of pieces of aperiodic CSI feedback indication information; and the base station configures the information of the resource occupied by the scheduling grant command and/or the information of the resource occupied by the data channel that is indicated by the scheduling grant command, to use a modulo operation result as the CSI location label, where the modulo operation result is obtained by performing a modulo operation by the number 3 of pieces of aperiodic CSI feedback indication information in the higher layer signaling on the information of the resource occupied by the scheduling grant command and/or the information of the resource occupied by the data channel that is indicated by the scheduling grant command. If the CSI location label is 1, respectively, the index of the physical resource block occupied by the data channel transmission in the scheduling grant command may be configured as 3, and the index of the subframe where the data channel is located may be configured as 4.

Secondly, the user equipment receives the higher layer signaling and the scheduling grant command, performs a modulo operation by the number 3 of pieces of aperiodic CSI feedback indication information according to a sum of an index 3 of the physical resource block occupied by the data channel transmission and an index 4 of the subframe where the data channel is located, and uses a modulo operation result as the CSI location label, that is, the obtained CSI location label is 1.

Thirdly, carrier information 1 that is equal to the CSI location label 1 is obtained, and corresponding CSI of carriers 1 and 3 in the aperiodic CSI feedback indication information is sent to the base station through the data channel.

Finally, the base station receives the CSI of the carriers 1 and 3.

Configuration Mode 2:

Firstly, the base station configures the higher layer signaling and the scheduling grant command according to the CSI location label, where the higher layer signaling includes information in the table in the situation 2, that is, aperiodic CSI feedback indication labels 0, 1, and 2 and corresponding carrier information 2, 1, 3, and 0, and the number 3 of pieces of aperiodic CSI feedback indication information; and the base station configures the information of the resource occupied by the scheduling grant command and/or the information of the resource occupied by the data channel that is indicated by the scheduling grant command, to use a modulo operation result as the CSI location label, where the modulo operation result is obtained by performing a modulo operation by the number 4 of carriers which the scheduling grant command accesses on the information of the resource occupied by the scheduling grant command and/or the information of the resource occupied by the data channel that is indicated by the scheduling grant command. If the CSI location label is 1, respectively, the index of the physical resource block occupied by the data channel in the scheduling grant command may be configured as 0, and the index of the subframe where the data channel is located may be configured as 1.

Secondly, the user equipment receives the higher layer signaling and the scheduling grant command, performs a modulo operation by the number 4 of pieces of aperiodic CSI feedback indication information according to a sum of an index 0 of the physical resource block occupied by the data channel transmission and an index 1 of the subframe where the data channel is located, and uses a modulo operation result as the CSI location label, that is, the obtained CSI location label is 1.

Thirdly, an aperiodic CSI feedback indication label 1 that is equal to the CSI location label 1 is obtained, and corresponding CSI of carriers 1 and 3 in the aperiodic CSI feedback indication information is sent to the base station through the data channel.

Finally, the base station receives the CSIs of the carriers 1 and 3.

In the configuration mode 1 or configuration mode 2 in the preceding situation 2, if the base station wants to receive only the CSI of the carrier 3 in the carriers 1 and 3, the scheduling grant command configured by the base station may further include CSI carrier selection information. The CSI carrier selection information is written as "3". After the user equipment receives the selection information, the user equipment sends only the CSI of the carrier 2 to the base station.

In this embodiment of the present invention, the CSI location label may be obtained through the higher layer signaling and/or the scheduling grant command, and the CSI of the carrier corresponding to the CSI location label may be sent or received without changing a length of an aperiodic CSI request field. In this way, CSIs of a part or all of cells and/or carriers can be triggered flexibly between the user equipment and the base station, and the design of the scheduling grant command is simplified.

The preceding descriptions are merely exemplary embodiments of the present invention, but are not intended to limit the protection scope of the present invention. Any modification or replacement easily thought of by those skilled in the art within the scope of the technology disclosed in the present invention shall fall within the protection scope of the present invention. Therefore, the protection scope of the present invention shall be subject to the protection scope of the appended claims.

What is claimed is:

1. A method for providing aperiodic channel state information (CSI) feedback in a network utilizing carrier aggregation, the method comprising:
   receiving, by a user equipment, a scheduling grant command from a base station, the scheduling grant command indicating a data channel on an uplink carrier that is to be used for uplink data communications;
   determining, by the user equipment, an index identifying one downlink carrier based on an index identifying the uplink carrier, wherein the index identifying the one downlink carrier is equal to the index identifying the uplink carrier; and
   sending, by the user equipment to the base station through the data channel, aperiodic CSI of the one downlink carrier, corresponding to the determined index, of a plurality of downlink carriers configured for the user equipment.

2. The method according to claim 1, before the receiving the scheduling grant command, the method further comprising:
   receiving, by the user equipment, higher layer signaling from the base station, the higher layer signaling indicating a carrier set, the carrier set comprising at least one downlink carrier of the plurality of downlink carriers configured for the user equipment, wherein the higher layer signaling specifies the at least one downlink carrier for aperiodic CSI feedback.

3. The method according to claim 1, before the receiving the scheduling grant command, further comprising:
   receiving, by the user equipment from the base station, radio resource control (RRC) signaling, wherein the RRC signaling is used for configuring the plurality of downlink carriers for the user equipment.

4. The method according to claim 3, after receiving the RRC signaling, further comprising:
   receiving, by the user equipment from the base station, media access control (MAC) signaling, wherein the MAC signaling is used for activating the one downlink carrier.

5. The method according to claim 1, wherein the scheduling grant command is an uplink scheduling grant command comprising a CSI request field, the CSI request field indicating the user equipment to send aperiodic CSI feedback.

6. A user equipment for providing aperiodic channel state information (CSI) feedback in a network utilizing carrier aggregation, comprising:
   a processor;
   a receiver coupled with the processor,
   wherein the receiver receives a scheduling grant command from a base station, the scheduling grant command indicating a data channel on an uplink carrier that is to be used for uplink data communications; and
   a transmitter coupled to the processor, wherein
      the processor determines an index identifying one downlink carrier based on an index identifying the uplink carrier, wherein the index identifying the one downlink carrier is equal to the index identifying the uplink carrier, and
      the processor further causes the transmitter to send, to the base station through the data channel, aperiodic CSI of the one downlink carrier, corresponding to the determined index, of a plurality of downlink carriers configured for the user equipment.

7. The user equipment according to claim 6, wherein the receiver is further configured to receive higher layer signaling from the base station, the higher layer signaling indicating a carrier set, the carrier set comprising at least one downlink carrier of the plurality of downlink carriers configured for the user equipment, wherein the higher layer signaling specifies the at least one downlink carrier for aperiodic CSI feedback.

8. The user equipment according to claim 6, wherein the receiver is further configured to receive, from the base station, radio resource control (RRC) signaling, wherein the RRC signaling is used for configuring the plurality of downlink carriers for the user equipment.

9. The user equipment according to claim 8, wherein the receiver is further configured to receive, from the base station, media access control (MAC) signaling, wherein the MAC signaling is used for activating the one downlink carrier.

10. The user equipment according to claim 6, wherein the scheduling grant command is an uplink scheduling grant command comprising a CSI request field, the CSI request field of the aperiodic CSI indicates the user equipment to send aperiodic CSI feedback.

11. The method according to claim 1, wherein the index of the uplink carrier is obtained according to carrier indicator field (CIF) in the scheduling grant command.

12. The method according to claim 1, wherein the index of the uplink carrier is obtained according to an index of a carrier for receiving the scheduling grant command.

13. The user equipment according to claim 6, wherein the index of the uplink carrier is obtained according to carrier indicator field (CIF) in the scheduling grant command.

14. The user equipment according to claim 6, wherein the index of the uplink carrier is obtained according to an index of a carrier for receiving the scheduling grant command.

15. An apparatus in a user equipment, comprising:
    a storage medium including executable instructions; and
    a processor;
    wherein the executable instructions, when executed by the processor, cause the apparatus to perform the step of:
    receiving a scheduling grant command from a base station, the scheduling grant command indicating a data channel on an uplink carrier that is to be used for uplink data communications; and
    determining an index identifying one downlink carrier based on an index identifying the uplink carrier, wherein the index identifying the one downlink carrier is equal to the index identifying the uplink carrier; and
    sending, to the base station through the data channel, aperiodic CSI of one downlink carrier, corresponding to the determined index, of a plurality of downlink carriers configured for the user equipment.

16. The apparatus according to claim 15, wherein the executable instructions, when executed by the processor, cause the apparatus to perform the step of:

receiving higher layer signaling from the base station, the higher layer signaling indicating a carrier set, the carrier set comprising at least one downlink carrier of the plurality of downlink carriers configured for the user equipment, wherein the higher layer signaling specifies the at least one downlink carrier for aperiodic CSI feedback.

17. The apparatus according to claim 15, wherein the executable instructions, when executed by the processor, cause the apparatus to perform the step of:

identifying the plurality of downlink carriers configured by radio resource control (RRC) signaling, the RRC signaling being used for configuring the plurality of downlink carriers for the user equipment and being received from the base station.

18. The apparatus according to claim 17, wherein the executable instructions, when executed by the processor, cause the apparatus to perform the step of:

after receiving the RRC signaling, receiving from the base station, radio resource control (RRC) signaling, wherein the RRC signaling is used for configuring the plurality of downlink carriers for the user equipment.

19. The apparatus according to claim 15, wherein the scheduling grant command is an uplink scheduling grant command comprising a CSI request field, the CSI request field of the aperiodic CSI indicates the user equipment to send aperiodic CSI feedback.

20. The apparatus according to claim 15, wherein the index of the uplink carrier is obtained according to an index of a carrier for receiving the scheduling grant, and the index of the carrier for receiving the scheduling grant command is comprised in a carrier indicator field (CIF) in the scheduling grant command.

* * * * *